United States Patent [19]

de Vrijer

[11] Patent Number: 4,760,501
[45] Date of Patent: Jul. 26, 1988

[54] HEADLAMP SYSTEM

[75] Inventor: Bertus de Vrijer, Eindhoven, Netherlands

[73] Assignee: U.S. Philips Corporation, New York, N.Y.

[21] Appl. No.: 115,598

[22] Filed: Oct. 26, 1987

Related U.S. Application Data

[63] Continuation of Ser. No. 4,225, Jan. 7, 1987, abandoned, which is a continuation of Ser. No. 700,435, Feb. 11, 1985, abandoned.

[30] Foreign Application Priority Data

Feb. 27, 1984 [NL] Netherlands ............................ 8400592

[51] Int. Cl.$^4$ .................................................. B60Q 1/00
[52] U.S. Cl. ........................................ 362/80; 362/261; 362/310
[58] Field of Search ............. 362/61, 261, 296, 301, 362/303, 307, 310, 341, 347

[56] References Cited

U.S. PATENT DOCUMENTS

| | | | |
|---|---|---|---|
| 3,062,951 | 11/1962 | Falge | 362/211 |
| 3,894,227 | 7/1975 | Pitkjaan et al. | 362/61 |
| 3,999,056 | 12/1976 | Faulhaber | 362/268 |
| 4,286,308 | 8/1981 | Wolff | 362/80 |
| 4,367,433 | 1/1983 | Cortorillo | 315/49 |
| 4,420,801 | 12/1983 | Reiling et al. | 362/309 |
| 4,441,783 | 4/1984 | Houghton et al. | 362/300 |
| 4,456,948 | 6/1984 | Brun | 362/300 |
| 4,503,488 | 3/1985 | Soules et al. | 362/310 |

*Primary Examiner*—Charles J. Myhre
*Assistant Examiner*—David A. Okonsky
*Attorney, Agent, or Firm*—Emmanuel J. Lobato

[57] ABSTRACT

The headlight system has a pair of low beam and a pair of high beam lamps (1a, 1b; 2a, 2b) adapted to be mounted in the front part (3) of an automobile with one lamp of each pair to a respective side of the front part. The lamps each have a flattened concave reflector, a high-pressure discharge arc in a translucent envelope as a compact light source, and a substantially quadrangular lens. The ratio of width and height of the lens is larger than 3 and the height is smaller than 6 cm. The low-beam lamps produce a beam of uniform brightness, large width and length and sharp light darkness transitions, as a result of which the risk of dazzling is small despite a large viewing distance.

6 Claims, 2 Drawing Sheets

HEADLAMP SYSTEM

This is a continuation of application Ser. No. 004,225, filed Jan. 7, 1987, now abandoned; which was a continuation of Ser. No. 700,435, filed Feb. 11, 1985 now abandoned.

BACKGROUND OF THE INVENTION

The invention relates to a headlight system comprising two pairs of lamps adapted to be mounted in the front part of an automobile with the lamps of each pair being disposed at respective sides of the center of the front part, the lamps of one pair each producing a low beam during operation and the lamps of the other pair each producing a high beam during operation. The lamps each have a flattened concave reflector having an optical axis and a focus and which is closed by a substantially quadrangular lens, and a compact light source axially arranged in said reflector. Such a headlight system is in use in automobiles.

When designing automobiles, attempts are made to minimize the air resistance by choosing an aerodynamically favorable form. However, the height needed in the front part of automobiles to accomodate lamps for a high beam and for a low beam limits the freedom of choice. In conventional headlight systems, in which a filament is used as a light source, as in an incandescent lamp having a halogen-containing gas filling, reflectors having a large reflecting surface area and large lenses are required to form an acceptable light beam from the light generated by the filament. The size of the reflectors and the lenses necessitate a high front part of the automobile.

Headlight system low-beam lamps are required to uniformly illuminate the road surface over the largest possible distance, but they must not dazzle oncoming drivers. These requirements are essentially incompatible and can normally only be approximately satisfied provided that large reflectors and large lenses are used.

SUMMARY OF THE INVENTION

The term "lens" is to be understood herein to mean a translucent or transparent member provided with optical elements for deflecting, bending and/or spreading light to give the light beam passing through the reflector its form.

An object of the invention is to provide a headlight system of the kind mentioned in the opening paragraph, which comprises lamps of very small height but which nevertheless are able to produce low beams which uniformly illuminate the road surface in front of the automobile over a large distance and width and substantially do not dazzle oncoming drivers.

According to the invention, a headlight system light source of each lamp is a high-pressure gas discharge arc in a translucent or transparent envelope, and the lens of each lamp is an elongate lens, for example, quadrangular. The ratio of the average width dimension and the average height dimension of the substantially quadrangular lens is larger than three, and the average height dimension of the lens is smaller than six cm.

It has surprisingly been found that the low-beam lamps of an automobile provided with this headlight system illuminate the road surface in front of the automobile very brightly and uniformly over a very large distance and width. Moreover, the luminous intensity diagram of the system exhibits a very steep gradient near the point of disappearance and therefore oncoming drivers are not likely to encounter any substantial amounts of scattered light which could dazzle them. Furthermore, in the proximity of the automobile, a bright illumination of the road for oncoming traffic as far as the remote verge can be obtained. It has been found that in all these respects the low beam has more favorable properties than those of conventional headlight systems having much larger lamps.

Much less stringent requirements are imposed on high-beam lamps; in particular no requirements are imposed with respect to large brightness gradients in the emitted beam. By using a compact high-pressure gas discharge arc in the high-beam lamps of the invention the latter produce excellent high beams.

In a particular embodiment of the headlight system, the optical axis of the reflector in the low-beam lamps is located at a distance of less than ¼ of the height of the lens from the lower edge of the lens.

In order to obtain low beams having a comparatively small beam component directed to the nearest verge or shoulder of the road, in a preferred embodiment, the optical axis intersects the lens at a very small height, for example, at least substantially at the level of its lower edge. In a very favorable embodiment, the reflector of a low-beam lamp is recessed near the focal plane away from the optical axis in order to provide room for the envelope of the light source and, as the case may be, a dipping cap. In another embodiment, the recess in the reflector constitutes an integral dipping cap for the light source.

BRIEF DESCRIPTION OF THE DRAWING

Embodiments of the headlight system according to the invention will now be described, by way of example, with reference to the accompanying drawing. In the drawing:

FIG. 6b gives a diagrammatic indication of the relative size of the lens of the lamp of FIG. 6a;

FIG. 7b gives an indication of the relative size of the lens used in the lamp of FIG. 7a;

FIG. 8b gives an indication of the relative size of the lens used in the lamp of FIG. 8a.

DETAILED DESCRIPTION OF THE INVENTION

Figure 1:
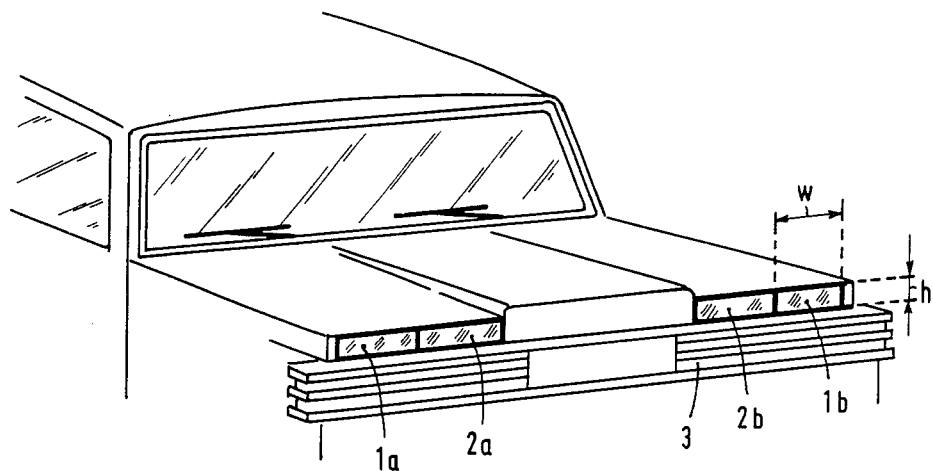
FIG. 1 is a perspective view of the headlight system in the front part of an automobile.

In FIG. 1, the headlight system has two pairs of lamps 1a, 1b and 2a, 2b, respectively, one lamp 1a, 2a and 1b, 2b, respectively, of each pair being mounted on either side of the center of the front part 3 of the automobile. The lamps 1a, 1b produce a low beam during operation, while the lamps 2a, 2b produce a high beam during operation. In the Figure, only the substantially quadrangular lenses of the lamps, with their respective average height dimension h and average width dimension w, are visible. Behind each lens there is provided a flattened concave reflector having an optical axis and a focus, which is closed by the lens and in which a compact high-pressure discharge arc is arranged in a transparent envelope provided with electrodes. The ratio of the dimensions w and h for each lens is larger than 3, i.e. about 4 and the height dimension h is smaller than 6 cm, i.e. about 5 cm.

Figure 2:
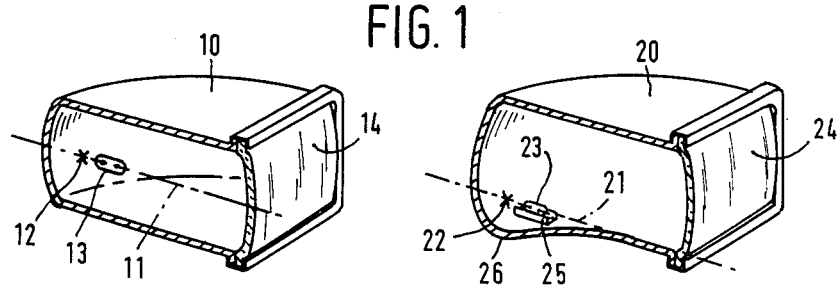
FIG. 2 is a developed perspective view of a high beam lamp.

In FIG. 2, a flattened concave paraboloidal reflector 10 has an optical axis 11 and a focus 12. As a compact light source 13, a high-pressure gas discharge arc in a transparent envelope provided with electrodes is arranged on the optical axis. The reflector 10 is closed by a lens 14 of 4×20 cm. The lamp is suited to give a high beam. In case the lamp is to produce a low beam, the light source 13 is displaced to be in front of the focus 12 and a dipping cap is arranged below the light source (compare FIGS. 3, 4).

Figure 3:
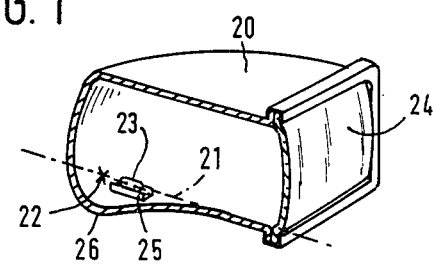
FIG. 3 is a developed perspective view of a first form of low-beam lamp.
Figure 4:
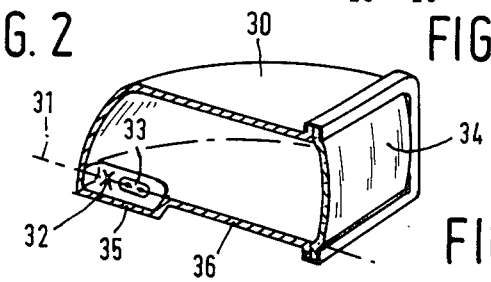
FIG. 4 is a developed perspective view of a second form of low-beam lamp.

In the lamps of FIGS. 3 and 4, corresponding parts are designated by a reference numeral which is 10 higher than in the preceding Figure.

In FIG. 3, the bottom 26 of the reflector 20 recedes near its focus away from the optical axis 21. The optical axis 21 passes through the lower edge of the lens 24. A non-reflecting dipping cap 25 partly covers the light source 23 which comprises a high-pressure discharge arc, in an envelope, having an arc length of 4.7 mm and an arc diameter of 1.3 mm, measured between two diametrically opposite points at which the intensity is 20% of the maximum intensity. The light source 23 is axially positioned on the optical axis of the reflector in a manner such that its center is shifted 5.3 mm from the focus towards the lens. The paraboloid has a focal distance of 25 mm. The lens dimensions are 5×20 cm. The discharge envelope has a filling of 53.5 kPa argon and 1 mg of a mixture of sodium iodide, scandium iodide, and thorium iodide in a molar ratio of 94.5:4.4:1.1. The lamp consumes 35 watts when drive by 100 V at 7 kHz, and produces 2500 lm.

In FIG. 4, the bottom 36 of the reflector 30 also recedes from the optical axis 31, the recess in the reflector constituting an integral dipping cap 35. The lens has the dimensions 4×20 cm.

Figure 5:
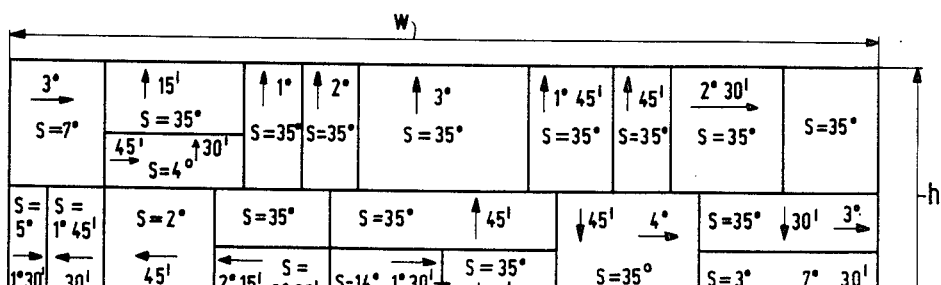
FIG. 5 shows a descriptive representation of the lens of a low-beam lamp.

In FIG. 5, the lens used in FIG. 3 is described, viewed from the reflector. This particular lens is intended for vehicles driven on the right side of the road. Each box represents an optical element. An arrow and associated angle value indicate in which direction and at which angle the incident light is deflected by a prismatic element. Two arrows in one plane indicate an optical element composed of two superimposed prismatic elements. The letter "S" indicates that the relevant box has a light spreading element, which may be superimposed on a prism. A light spreading element consists of continuous vertical grooves having a width of 6 mm, and which are curved circularly in the horizontal direction. Its light spreading power is indicated behind the letter S. The lens is formed so that, when it is used in the lamp of FIG. 3, it supplies the beam of FIG. 6a.

Figure 6A:
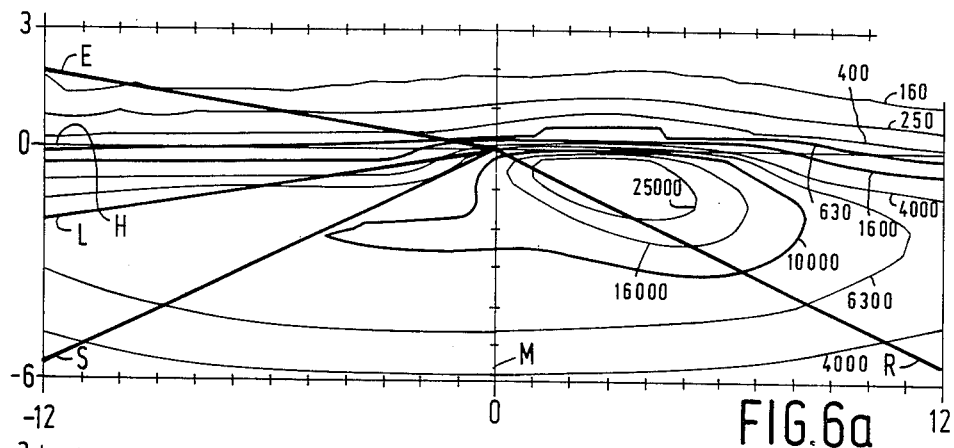
FIG. 6a shows an isocandela diagram obtained with the lamp of FIG. 3 and the lens of FIG. 5.

FIG. 6a shows an isocandela diagram which is obtained with the low-beam lamp shown in FIG. 3, including the high-pressure discharge arc thereof consuming 35 W and the lens shown in FIG. 5.

This diagram was obtained by arranging a screen on a road at a distance of 25 m from the low-beam lamp and at right angles to its optical axis. The curves each indicate points having the same luminous intensity, expressed in candela. A coordinate system defined by the straight lines H and M was superimposed on the light pattern obtained on the screen. H is a horizontal straight line at the same level as the optical axis of the reflector, while M is a vertical straight line through this optical axis. The straight line R indicates the course of the righthand boundary of the road, viewed from the reflector, while M indicates the center of the righthand lane, S indicates the separation line between the righthand and the lefthand lanes and L indicates the lefthand boundary of the road. The straight line E indicates the line along which the eye of an oncoming driver moves from afar (the point of intersection of H and M). Elevation angles relative to a line from the reflector to the point of intersection of the lines M and H, are indicated by transverse lines on the line M and parallel to H. The diagram therefore shows the range of from −12° to +12° in the horizontal direction and of from −6° to +3° in a vertical direction with reference to the intersection point of lines H and M.

In the diagram, the spatial angle which is filled by an effective low beam is limited by the 1600 cd line. The range of low intensity light lies outside the 630 cd line, while the transition range lies between the 1600 cd line and the 630 cd line. Within the effective low beam, the beam of high brightness is limited by the 10,000 cd line.

The following characteristics clearly appear from the diagram:

the high degree of uniformity of the beam;

the extent of the beam, both in horizontal and in vertical direction;

the steep gradient near the line H at which the 25000 cd line and the 630 cd line lie very close to each other in the righthand quadrants, which means a large viewing distance without much risk of dazzling a driver in front;

the low intensities of light in the quadrant in the lefthand upper part, i.e. the quadrant in which the risk of dazzling an oncoming driver is a maximum. The 630 cd line coincides for the major part with the line H and projects above the line H only at a very short distance from the origin of the coordinate system.

The beam provided thus produces a very large viewing distance, a high degree of uniformity, a large spread and a very low dazzling level.

Figure 7A:
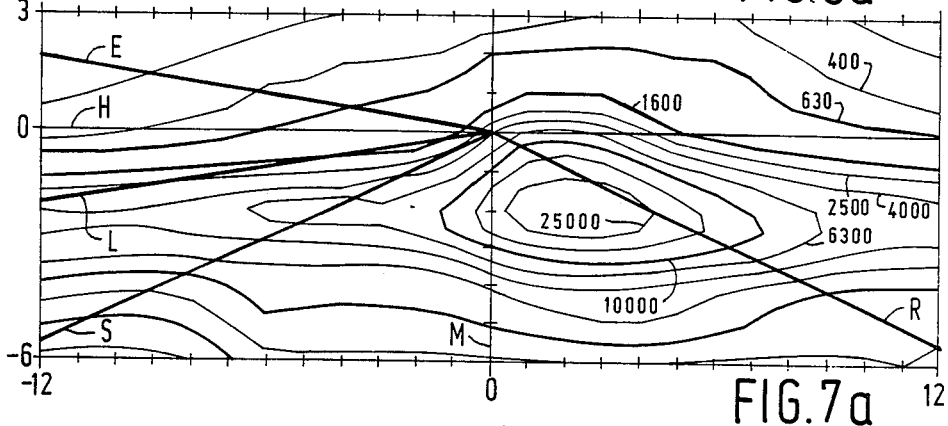
FIG. 7a shows an isocandela diagram of a known low-beam lamp having as a light source a halogen incandescent bulb.
Figure 8A:
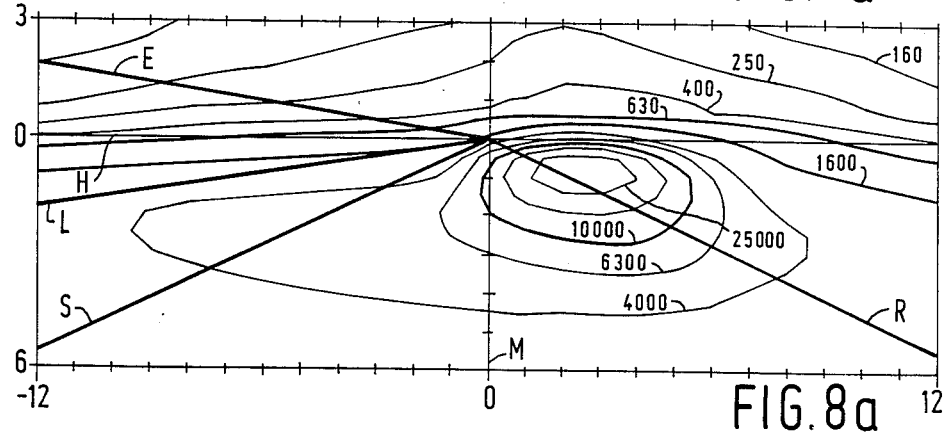
FIG. 8a shows an isocandela diagram of another known low-beam lamp also having as a light source halogen incandescent bulb.
Figure 6B:
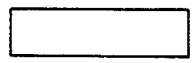
Figure 7B:
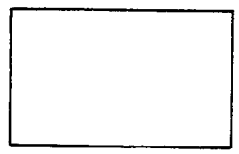
Figure 8B:

FIG. 6b indicates diagrammatically the size of the lens which forms the beam illustrated in FIG. 6a for comparison with known lens sizes as indicated in FIGS. 7b and 8b.

FIG. 7a shows the diagram of the low beam drawn in the same manner as in FIG. 6a, while FIG. 7b indicates the relative size of the lens used for this purpose, obtained by means of a C6C6 lamp, i.e. an incandescent lamp having two transversely arranged filaments, one of which, consuming 45 W and transversely arranged in the focus in a reflector having a focal distance of 31.75 mm, produces the low beam, while the other produces a high beam. In this lamp, the optical axis of the reflector intersects the lens at one half of its height.

The diagram clearly shows:

a low degree of uniformity of the beam, especially immediately in front of the lamp (righthand lower part);

the small extent of the effective beam; the 25000 cd line is small and lies low in the diagram;

the small spread of the beam; the 10,000 cd line does not come close to the line S;

a very small gradient near the line H in the righthand quadrants; even the 630 cd and the 6300 cd lines lie a considerable distance apart;

high intensities in the quadrant in the lefthand upper part; even the 1600 cd line projects at the origin of the coordinate system over a large distance above the line H.

The beam represented in FIG. 7a thus provides a comparatively small visibility distance, a comparatively low degree of uniformity and a comparatively high dazzling level in spite of the large reflector and the large lens by which it is formed.

FIG. 8a shows the diagram of the low beam of another known lamp drawn in the same manner as in FIG. 6a, while FIG. 8b indicates the relative size of the lens used for this purpose, obtained by means of an H4-lamp, i.e. a halogen headlight lamp having two axial filaments, one of which consumes 50 W, and is arranged 1 mm in front of the focus in a reflector having a focal distance of 31.75 mm and produces the low beam by means of a dipping cap. In this lamp, the optical axis of the reflector intersects the lens at one half of its height.

The diagram shows:

a high degree of uniformity of the beam;

the reasonable extent of the beam in the vertical direction, but a very small horizontal spread;

a gradient in the righthand quadrants near the line H, which is smaller than that in the first diagram (FIG. 6a);

comparatively low intensities in the quadrant in the lefthand upper part.

The beam represented in FIG. 8a thus provides a fairly large visibility distance, a reasonable degree of uniformity, a small spread and a low dazzling level. Although the light beams described are designed for vehicles which drive on the right side of the road, it will be appreciated that lamps which form the mirror image of the lamps described may be used for vehicles which drive on the left side of the road.

What is claimed is:

1. A headlight system for continuous illumination comprising two pairs of lamps adapted to be mounted in a front part of an automobile with a lamp from each pair being disposed at respective sides of a center of the front part, the lamps of one pair each producing during operation a low beam and the lamps of the remaining pair each producing during operation a high beam, the lamps of both pairs each have a flattened concave reflector having an optical axis and a focus and which is closed by a substantially quadrangular lens, and a compact light source axially arranged in said reflector, characterized in that the light source of each lamps is a high-pressure gas discharge arc in a translucent envelope, the ratio of an average width dimension to an average height dimension of the substantially quadrangular lenses is larger than 3, and the average height dimension of the lenses is smaller than 6 cm.

2. A headlight system as claimed in claim 1, characterized in that in the low-beam lamps the optical axis of the reflector is located at a distance of less than ¼ of the height of the lens from a lower edge of the lens.

3. A headlight system as claimed in claim 2, characterized in that the optical axis of at least the low beam lamp reflector intersects the lens at least substantially at the level of its lower edge.

4. A headlight system as claimed in claim 3, characterized in that at least the low beam lamp reflector is recessed near its focal plane away from the optical axis in order to provide room for the envelope of the light source.

5. A headlight system as claimed in claim 4, characterized in that a dipping cap partly covers the light source.

6. A headlight system as claimed in claim 4, characterized in that the recess in at least the low beam lamp reflector constitutes an integral dipping cap for the light source.

* * * * *